US008650029B2

(12) United States Patent
Thambiratnam et al.

(10) Patent No.: US 8,650,029 B2
(45) Date of Patent: Feb. 11, 2014

(54) LEVERAGING SPEECH RECOGNIZER FEEDBACK FOR VOICE ACTIVITY DETECTION

(75) Inventors: Albert Joseph Kishan Thambiratnam, Beijing (CN); Weiwu Zhu, Beijing (CN); Frank Torsten Bernd Seide, Beijing (CN)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 13/035,044

(22) Filed: Feb. 25, 2011

(65) Prior Publication Data

US 2012/0221330 A1 Aug. 30, 2012

(51) Int. Cl.
*G10L 15/00* (2013.01)

(52) U.S. Cl.
USPC ............................ 704/233; 704/200; 704/201

(58) Field of Classification Search
USPC ......................................... 704/233, 200, 201
See application file for complete search history.

(56) References Cited

U.S. PATENT DOCUMENTS

| | | | | |
|---|---|---|---|---|
| 5,727,072 | A * | 3/1998 | Raman ........................ | 381/94.2 |
| 7,039,181 | B2 | 5/2006 | Marchok et al. | |
| 7,203,644 | B2 | 4/2007 | Anderson et al. | |
| 7,263,074 | B2 * | 8/2007 | LeBlanc ....................... | 370/286 |
| 7,440,891 | B1 * | 10/2008 | Shozakai et al. ............. | 704/233 |
| 7,475,012 | B2 * | 1/2009 | Garner et al. ................ | 704/233 |
| 7,881,927 | B1 * | 2/2011 | Reuss .......................... | 704/226 |
| 2002/0116187 | A1 * | 8/2002 | Erten .......................... | 704/233 |
| 2005/0049864 | A1 * | 3/2005 | Kaltenmeier et al. ........ | 704/233 |
| 2005/0143989 | A1 * | 6/2005 | Jelinek ........................ | 704/226 |
| 2006/0053007 | A1 * | 3/2006 | Niemisto ..................... | 704/233 |
| 2006/0253283 | A1 * | 11/2006 | Jabloun ....................... | 704/233 |
| 2008/0040109 | A1 * | 2/2008 | Muralidhar et al. ......... | 704/233 |
| 2008/0249771 | A1 * | 10/2008 | Wahab ........................ | 704/233 |
| 2008/0294433 | A1 * | 11/2008 | Yeung et al. ................ | 704/235 |
| 2010/0088094 | A1 * | 4/2010 | Wang .......................... | 704/233 |
| 2010/0223053 | A1 * | 9/2010 | Sandgren et al. ............ | 704/219 |
| 2010/0268533 | A1 * | 10/2010 | Park et al. ................... | 704/233 |
| 2011/0184734 | A1 * | 7/2011 | Wang et al. ................. | 704/233 |

OTHER PUBLICATIONS

Benyassine, et al., "ITU-T Recommendation G.729 Annex B: A Silence Compression Scheme for Use With G.729 Optimized for V.70 Digital Simultaneous Voice and Data Applications", IEEE Communications Magazine, vol. 35, No. 9, Sep. 1997, pp. 64-73.

Breithaupt, et al., "Voice Activity Detection in the DFT Domain Based on a Parametric Noise Model", retrieved at <<http://www.iwaenc.org/proceedings/2006/pdf/A29.pdf>>, 2006 International Workshop on Acoustic Echo and Noise Control (IWAENC 2006), Sep. 2006, 4 pages.

Cho, et al., "Analysis and Improvement of a Statistical Model-Based Voice Activity Detector", IEEE Signal Processing Letters, vol. 8, No. 10, Oct. 2001, pp. 276-278.

(Continued)

*Primary Examiner* — Douglas Godbold
(74) *Attorney, Agent, or Firm* — Carole Boelitz; Micky Minhas (57) ABSTRACT

A voice activity detection (VAD) module analyzes a media file, such as an audio file or a video file, to determine whether one or more frames of the media file include speech. A speech recognizer generates feedback relating to an accuracy of the VAD determination. The VAD module leverages the feedback to improve subsequent VAD determinations. The VAD module also utilizes a look-ahead window associated with the media file to adjust estimated probabilities or VAD decisions for previously processed frames.

20 Claims, 6 Drawing Sheets

(56) References Cited

OTHER PUBLICATIONS

ETSI, "Digital cellular telecommunications system (Phase 2+);Voice Activity Detector (VAD) for Adaptive Multi-Rate (AMR) Speech Traffic Channels", ETSI EN 301 708 V7.1.1, Dec. 1999, 28 pages.

ETSI, "Speech Processing, Transmission and Quality Aspects (STQ); Distributed Speech Recognition; Advanced Front-End Feature Extraction Algorithm; Compression Algorithms", ETSI ES 202 050 V1.1.5, Jan. 2007, 45 pages.

Godfrey, et al., "Switchboard: Telephone Speech Corpus for Research and Development", IEEE International Conference on Acoustics, Speech, and Signal Processing, (ICASSP-92), vol. 1, Mar. 1992, pp. 517-520.

Haigh, et al., "Robust Voice Activity Detection Using Cepstral Features", IEEE Region 10 Conference on Computer, Communication, Control and Power Engineering (TENCON '93), vol. 3, Oct. 1993, pp. 321-324.

Hari Krishnan P, et al., "Robust Voice Activity Detection using Group Delay Functions", IEEE International Conference on Industrial Technology (ICIT 2006), Dec. 2006, pp. 2603-2607.

ITU, "A Silence Compression Scheme for G. 729 Optimized for Terminals Conforming to Recommendation V. 70", ITU-T Recommendation G.729-Annex B, Nov. 1996, 23 pages.

Junqua, et al., "A Study of Endpoint Detection Algorithms in Adverse Conditions: Incidence on a DTW and HMM Recognizer", In Second European Conference on Speech Communication and Technology (EUROSPEECH-1991), Sep. 1991, pp. 1371-1374.

Kang, et al., "Discriminative Weight Training for a Statistical Model-Based Voice Activity Detection", IEEE Signal Processing Letters, vol. 15, Jan. 2008, pp. 170-173.

Pearce, et al., "The Aurora Experimental Framework for the Performance Evaluation of Speech Recognition Systems Under Noisy Conditions", Sixth International Conference on Spoken Language Processing (ICSLP-2000), vol. 4, Oct. 2000, pp. 29-32.

Rabiner, et al., "Voiced-Unvoiced-Silence Detection Using the Itakura LPC Distance Measure", Conference Record 1977 IEEE International Conference on Acoustics, Speech, and Signal Processing, Hartford, Connecticut, May 1977, pp. 323-326.

Shin, et al., "Voice activity detection based on statistical models and machine learning approaches", Computer Speech and Language, vol. 24, Mar. 14, 2009, pp. 515-530.

Sohn, et al., "A Statistical Model-Based Voice Activity Detection", IEEE Signal Processing Letters, vol. 6, No. 1, Jan. 1999, pp. 1-3.

Tucker, "Voice Activity Detection Using a Periodicity Measure", IEE Proceedings I Communications, Speech and Vision, vol. 139, No. 4, Aug. 1992, pp. 377-380.

\* cited by examiner

LEVERAGING SPEECH RECOGNIZER FEEDBACK FOR VOICE ACTIVITY DETECTION

BACKGROUND

Voice activity detection (VAD) is a technique used in speech processing in which the presence or absence of human speech is detected. VAD is frequently used in a variety of different systems, such as systems including speech coding, speech enhancement, speech recognition, and echo cancellation, for example. Utilizing VAD, once it is determined that a portion of a particular piece of content or signal is speech, speech recognition techniques may be used to recognize the speech and convert the spoken words into text. For various types of speech recognition, such as online speech recognition, VAD is often an afterthought. Therefore, components that are designed for non-VAD tasks are often marginally modified to perform various VAD functions. However, since these VAD components are not designed for these VAD functions, the VAD may be inaccurate and/or inefficient.

SUMMARY

Described herein are techniques for leveraging feedback from a speech recognizer to improve voice activity detection (VAD). In various embodiments, a VAD module may determine whether frames of a media file include speech or non-speech. Once the frames are classified into speech frames and/or non-speech frames, the speech recognizer may convert the words and non-speech included in the speech frames and the non-speech frames, respectively, into a text transcript representative of the media file. Moreover, the VAD module may utilize feedback provided by the speech recognizer to improve VAD for frames not yet processed by the VAD module. In various embodiments, the VAD module and the speech recognizer may process the media file asynchronously such that the VAD module processes frames of the media file prior to the speech recognizer.

In other embodiments, described herein are techniques for utilizing a look-ahead window to improve VAD of a media file. More particularly, a probability of whether a first frame includes speech or non-speech may be maintained. Furthermore, the previously maintained probability may be updated based at least in part on probabilities associated with one or more additional frames of the media file that are either prior to or subsequent to the first frame. A VAD decision corresponding to the first frame may be delayed until a downstream component actually needs the VAD decision. At this point, the current probability may be returned and may be different from what may have been returned at an earlier time.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Described herein are systems and/or techniques for leveraging feedback from a speech recognizer to improve voice activity detection (VAD) for online speech recognition. VAD refers to a technique for breaking an audio or video file into one or more segments based on whether speech is detected in those segments. More particularly, a VAD module may determine which portions of an audio or video file, such as a recording, include speech and which portions of the file include silence and/or other types of non-speech. Once this determination is made, the VAD module may break the file into segments that contain speech and segments that do not contain speech. The segments or frames that include speech may then be accessed by a speech recognizer, which may convert the spoken words into text. Subsequently, the text associated with the speech may or may not be indexed. If the text associated with the speech is indexed, the text may, therefore, become searchable.

Given a recording, such as an audio file or a video file, it may be desirable to identify portions of the recording in which people are speaking and those portions of the recording in which there is no speech. If the file is not analyzed to detect which portions of the file include speech, a speech recognizer that converts the speech into text may create a transcript having a high error rate. For instance, since the speech recognizer may not know when speech begins and ends, the resulting transcript may contain parts of words that are either cut off at the beginning and/or at the end. Such errors may cause the transcript to be difficult to read and also may not accurately represent what was being spoken in the audio or video file, which may be frustrating to a reader of the transcript.

Typically, low computational signal processing approaches are utilized for VAD. Using this approach, a minimal amount of computational resources is used so that the results of VAD may be embedded on a chip. However, due in part to the limitation of computational resources being used, the quality of the VAD may be sacrificed. By leveraging feedback from a speech recognizer to guide VAD, the quality of the VAD need not be sacrificed and a minimal amount of computational resources may be utilized. For instance, assume that a relatively low-power component, such as a mobile telephone, is communicatively coupled to a higher-powered (e.g., increased computational resources, etc.) speech recognizer. In this embodiment, the low-power component, which contains a VAD module, may recognize which portions of an audio or video file are speech and which are non-speech. Subsequently, the broken up segments of the file may be transmitted to the speech recognizer. The speech recognizer may then convert the segmented portions of the file into text and feed the results back to the low-power component. Since the results from the speech recognizer may represent an accuracy of the VAD module in analyzing the audio or video file, the VAD module of the lower-power component may utilize this feedback to improve the robustness of the VAD module. In other words, the feedback from the speech recognizer may be leveraged by the VAD module in order to increase the VAD module's ability to detect speech versus non-speech in subsequent frames of the audio or video file.

Accordingly, feedback from the speech recognizer may instead be utilized. In various embodiments, the feedback may be associated with online large vocabulary continuous speech recognition (LVCSR). Leveraging speech recognizer feedback instead may result in the VAD module remaining more simple and compact. This may be important when a VAD module is running on low-resource devices, such as mobile phones, that are supported by a speech recognizer running on a remote server. As explained in additional detail below, at least two types of feedback may be leveraged: (1) directing VAD model adaptation with feedback and (2) directing look-ahead with feedback.

Various examples of VAD techniques are described below with reference to FIGS. 1-6.

Directing VAD Model Adaptation Feedback

Figure 1:
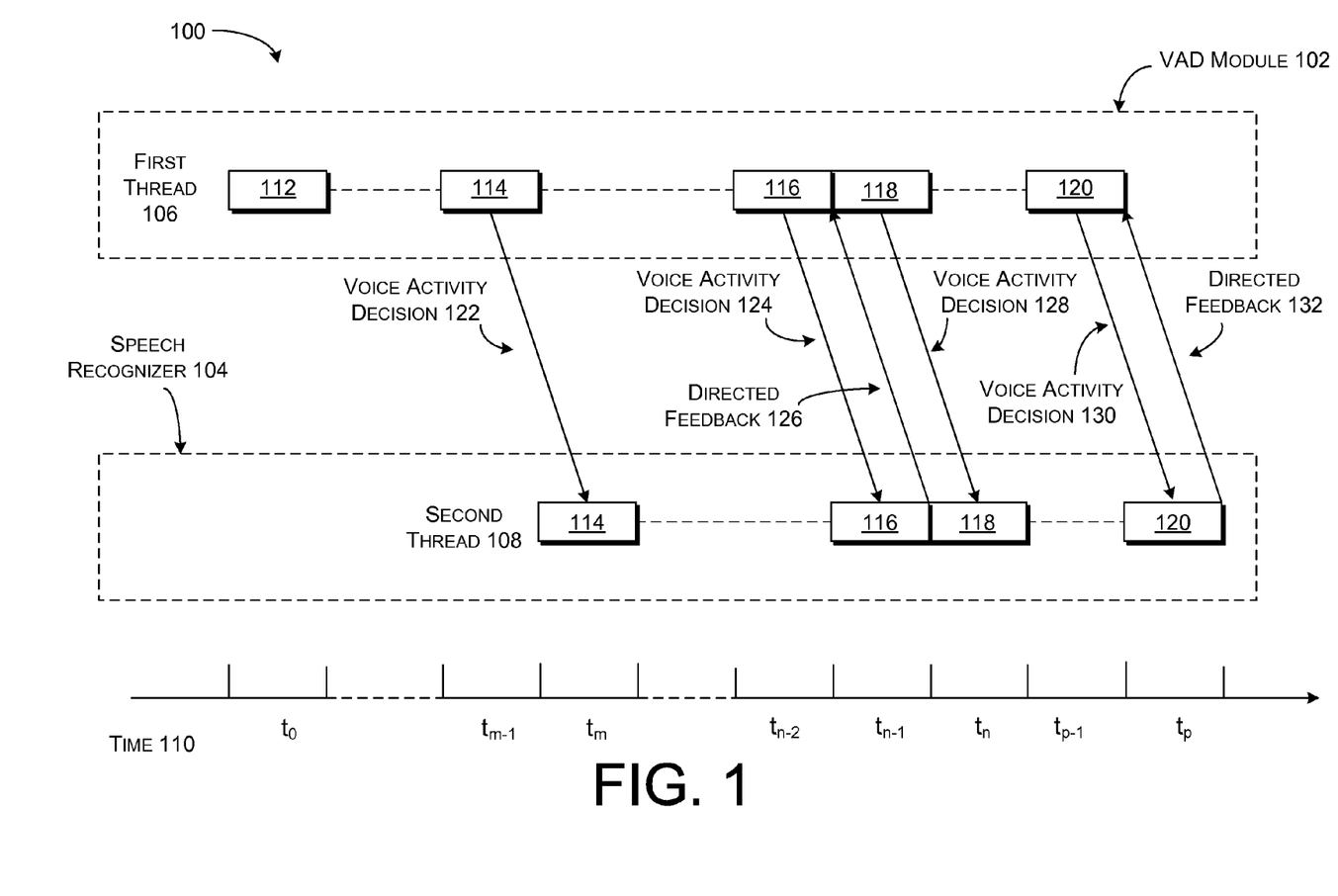
FIG. 1 illustrates a system for leveraging feedback from a speech recognizer to improve voice activity detection, in accordance with various embodiments.

FIG. 1 illustrates a system 100 for utilizing feedback from a speech recognizer to adapt VAD. In particular, the system 100 includes a VAD module 102 and a speech recognizer 104. Moreover, the system 100 includes a first thread 106 and a second thread 108. In various embodiments, the first thread 106 is associated with the VAD module 102 and the second thread 108 is associated with the speech recognizer 104. Moreover, the VAD module 102 may be stored in a mobile device, such as a mobile telephone, whereas the speech recognizer 104 may be running on a local or a remote server. Moreover, the VAD module 102 and the speech recognizer 104 may also reside on the same device. The first thread 106 and the second thread 108 may represent an audio file or a video file (hereinafter referred to as "audio file" or "media file"), which may include human speech and various types of non-speech, such as silence or other noise. In FIG. 1, the first thread 106 and the second thread 108 are shown with respect to time 110, where the time 110 begins at time $t_0$. Furthermore, the first thread 106 and the second thread 108 may include one or more frames of the media file, such as frames 112-120, as shown in FIG. 1. However, it is contemplated that any number of frames may be included in the media file.

As shown, the VAD module 102 corresponding to the first thread 106 and the speech recognizer 104 corresponding to the second thread 108 may each be processing and/or analyzing different point of the media file at any given time 110. In one embodiment, the first thread 106 and the second thread 108 may be asynchronous, meaning that the VAD module 102 and the speech recognizer 104 may be analyzing the same frame of the first thread 106 and the second thread 108, respectively, but at different times 110. For instance, frame 120 may be processed from the first thread 106 by the VAD module 102 at a time $t_p$ and the same frame 116 may be processed from the second thread 108 by the speech recognizer 104 at a subsequent time $t_n$. Therefore, frame 120 of the first thread 106 may be analyzed by the VAD module 102 at a time prior to analysis of the second thread 108. As shown in FIG. 1, time 110 includes times $t_0$, $t_{m-1}$, $t_m$, $t_{n-2}$, $t_{n-1}$, $t_n$, and $t_p$.

As mentioned previously, the VAD module 102 processes the first thread 106. More particularly, the VAD module 102 may break the media file (e.g., the first thread 106) into one or more frames (e.g., frames 112-120) and classify each frame as either speech or non-speech. That is, the VAD module 102 may detect whether each frame includes human speech or some form of non-speech (e.g., silence, noise other than speech, etc.). The speech recognizer 104 can request VAD information for a particular frame 112-120. Provided that the VAD module 102 has processed that frame 112-120, the VAD module 102 may then provide the requested VAD information to the speech recognizer 102. In another embodiment, the speech recognizer 104 may obtain VAD information for a particular frame 112-120 without first sending a request. For instance, the VAD module 102 may have performed VAD for frame 114 and detected that speech is included in that frame. A voice activity decision 122 associated with frame 114 may then be received by the speech recognizer 104. In various embodiments, the voice activity decision 122 may refer to a result of a determination of whether frame 114 includes speech or non-speech.

In the above embodiment, the speech recognizer 104 associated with the second thread 108 may request and/or obtain the voice activity decision 122 at time $t_0$. However, as shown in FIG. 1, the VAD module 102 associated with the first thread 106 may already be at time $t_{m-1}$. Accordingly, in this embodiment, the VAD module 102 may have processed more of the media file than the speech recognizer 104. Therefore, because the VAD module 102 has processed additional frames of the media file, the VAD module 102 may be able to make more robust decisions regarding the media file. Similar to frame 114, the VAD module 102 associated with the first thread 106 may also detect whether frame 116 includes speech or non-speech. Once this determination is made, a voice activity decision 124 associated with frame 116 may be transmitted by the VAD module 102 to the speech recognizer 104 associated with the second thread 108. As with frame 114, the VAD module 102 may process frame 116 at a time ($t_{n-2}$) earlier than the speech recognizer 104 receives the voice activity decision 124 associated with frame 116 ($t_{n-1}$).

Once the voice activity decision 124 is received by the speech recognizer 104, the speech recognizer 104 may process frame 116. In particular, if frame 116 is determined to include speech, the speech recognizer 104 may convert this speech into text. Therefore, the speech included within frame 116 may be converted into a text transcript. In an example embodiment, the speech recognizer 104 associated with the second thread 108 may transmit directed feedback 126 to the VAD module 102. The directed feedback 126 may include, for example, the text transcript mentioned above, a determination of the accuracy of the VAD module 102 with respect to frame 116, and/or any other information relating to frame 116 of the media file. Since the first thread 106 and the second thread 108 may be asynchronous, the VAD module 102 may have already processed additional frames, such as frame 118 and/or frame 120, when the VAD module 102 receives the directed feedback 126.

In various embodiments, upon receiving the directed feedback 126, the VAD module 102 may utilize the directed feedback 126 to improve the accuracy of its VAD. In various embodiments, the VAD module 102 may include one or more models utilized for VAD. More particularly, the models may be used for determining whether frames of a media file include speech and/or non-speech. Furthermore, the VAD module 102 may update its models so that it can more accurately determine whether a particular frame of the media file contains speech or non-speech. In addition, the VAD module 102 may utilize the updated models for VAD of subsequent frames of the media file not yet processed by the VAD module 102. More particularly, the VAD module 102 may use the directed feedback 126 to better determine when speech included in the media file begins and/or ends.

The VAD module 102 may continue to improve its recognition of speech versus non-speech in the media file by repeating the process described above with respect to subsequent frames, such as frame 118 and/or frame 120. For instance, once the VAD module 102 processes frame 118 and/or frame 120 of the first thread 106, voice activity decision 128 and voice activity decision 130, respectively, may be accessed by the speech recognizer 104. In response, the speech recognizer 104 may utilize voice activity decision 128 and voice activity decision 130 to convert the speech included in frame 118 and frame 120, respectively, into text transcripts. Directed feedback, such as directed feedback 132, may then be fed back to the VAD module 102. In various embodiments, the VAD module 102 may utilize the directed feedback to improve the accuracy and robustness of VAD performed by the VAD module 102. By repeatedly receiving directed feedback from the speech recognizer 104, the VAD module 102 may leverage this feedback so that it can continue to improve its VAD determinations.

Therefore, feedback from the speech recognizer 104 may be leveraged to improve VAD for online speech recognition. As a result, the VAD module 102 may develop more reliable and/or accurate techniques for identifying speech, silence, and/or other noise in a media file. More particularly, the directed feedback (e.g., directed feedback 126 and/or directed feedback 132), which may include a text transcript generated by the speech recognizer 104, may be used to adapt and improve the VAD module 102. As a result, VAD of the media file may be improved.

As stated above with respect to FIG. 1, speech within the media file may be identified and converted to text until an end-of-utterance is determined by the VAD module 102. For the purposes of this discussion, end-of-utterance may refer to when a speaker is finished speaking a word and/or a sentence. When the text transcript is created by the speech recognizer 104, the text transcript may be confidence-scored (e.g., by using word posterior scores from a recognition lattice) and confident frames may be fed back to the VAD module 102 as speech frames. In various embodiments, the confident frames may refer to frames of the media file in which the speech recognizer 104 is confident that those frames include spoken words. Similarly, frames that the speech recognizer 104 has confidently transcribed as silence and/or noise may be fed back as silence/noise frames. Words and/or frames within the media file may be deemed confident if they exceed a predetermined threshold for reliability. It is contemplated that the above threshold may be set to any value and the threshold may be user-defined or defined by the system 100. Upon receiving the feedback, the VAD models associated with the VAD module 102 may be adapted and recognition and VAD may continue with the newly updated VAD models. More particularly, the models associated with the speech recognizer 104 may be more powerful than the models utilized by the VAD module 102. That is, the more powerful speech recognition models may include more parameters, may be more complex, and/or may use much more computation than the VAD models. As a result, the more powerful speech recognition models may be better at classifying speech/noise than the models used in the VAD module 102. Accordingly, the more correct decisions made by the speech recognizer 104 may be fed back to the VAD module 102 to help ensure that the media file is being processed and classified correctly.

In one embodiment, by confidence scoring one or more frames of the media file, the more reliably transcribed parts of the media file may be used to improve the robustness of the VAD module 102, and VAD in particular. In various embodiments, the confident portions of the media file tend to be further away from speech, silence, and/or noise boundaries.

Directing Look-Ahead Feedback

Figure 2:
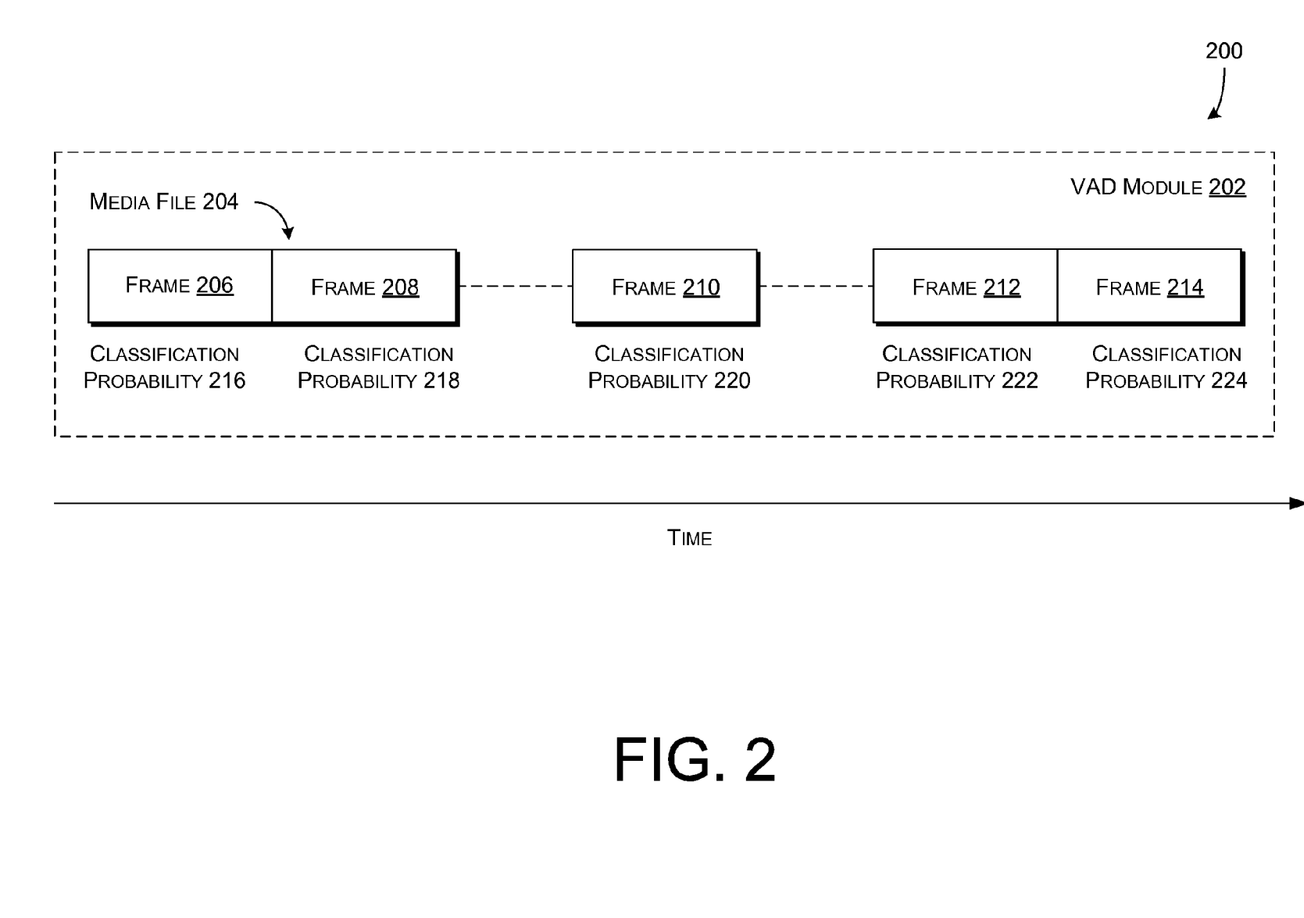
FIG. 2 illustrates a system for using a look-ahead window to improve voice activity detection, in accordance with various embodiments.

FIG. 2 illustrates a system 200 for improving the accuracy of VAD by using a look-ahead window. More particularly, the system 200 includes a VAD module 202 containing a media file 204 that may include one or more frames, such as frames 206-214. Moreover, each frame 206-214 may include an associated classification probability 216-224 such that frames 206-214 correspond to classification probabilities 216-225, respectively. The media file 204 may also be associated with a time such that frame 206 is associated with a time before frames 208-214. Likewise, frame 214 of the media file 204 may be rendered or processed subsequent in time to frames 206-212. For the purposes of this discussion, the media file 204 may include any type of media content, such as audio content and/or video content, for example. Moreover, the frames 206-214 as shown in FIG. 2 may each be denoted as t.

In various embodiments, assume that a VAD module 202, such as the VAD module 102 described in reference to FIG. 1, processes the media file 204 by determining whether each frame 206-214 of the media file 204 includes speech or non-speech. If the VAD module 102 knew whether subsequent frames (e.g., frames 212 and/or 214) included either speech or non-speech, the VAD module 102 may be able to make a more accurate VAD decision regarding a current frame (e.g., frame 210). Accordingly, providing the VAD module 102 a look-ahead window, such as by allowing the VAD module 102 to use subsequent VAD decisions and probabilities to make a VAD decision for a current frame, may allow the VAD module 102 to make more accurate VAD decisions.

Typically, VAD includes examining and analyzing a first frame (e.g., frame 210), such as by determining whether that frame includes speech or non-speech. Subsequently, a determination may be made regarding a second frame (e.g. frame 212 and/or frame 214) without reconsidering the correctness of the determination associated with the first frame. Therefore, the VAD module 102 may continue to evaluate subsequent frames without considering whether or not the previous determinations were correct. However, described herein are techniques for assigning and maintaining, at each frame 206-214, a probability (e.g., classification probability) regarding a classification for that frame. In various embodiments, the probabilities may be assigned and maintained without actually making a classification (VAD) decision at that time.

For instance, as the VAD module 102 processes a frame of the media file, for each frame, the VAD module 102 may update the probabilities for previous frames. In various embodiments, the VAD module 102 may update these probabilities as a side-effect of Viterbi decoding processing. Therefore, when the speech recognizer 104 requests a VAD decision for a particular frame, a current probability for the frame may be obtained from the current state of the VAD module 102. Therefore, the probabilities associated with each frame need not be recalculated at the time the speech recognizer 104 requests the VAD decision. Instead, the recalculation for each frame may occur as part of the processing by the VAD module 102.

In various embodiments, assume for the purposes of this discussion that frame 210 of the media file 204 is being analyzed for VAD. This analysis may include assigning and maintaining a probability for frame 210 that represents a likelihood that the frame includes speech and a likelihood that the frame includes non-speech. That is, the VAD module may assign and maintain, for any one frame (e.g., frames 206-214), a probability that the frame includes speech and the probability that the frame includes non-speech (e.g., silence, other types of noise, etc.). Alternatively, the VAD module 102 may assign and maintain a probability that the frame includes speech and then infer a probability that the frame includes non-speech, and vice versa. These probabilities are denoted as classification probabilities 216-224. However, a determination of whether that particular frame includes speech or non-speech need not be made at the time the classification probability 216-224 is assigned. For example, for frame 210, the VAD module 202 may refrain from making an affirmative VAD decision when frame 210 is processed, but instead may assign a 0.7 probability that frame 210 includes speech and a 0.3 probability that frame 210 includes non-speech (e.g., silence). Therefore, the above probability represents a 70% likelihood that frame 210 includes speech versus a 30% likelihood that frame 210 includes non-speech.

Once a classification probability is assigned for a particular frame (e.g., frame 210), classification probabilities (e.g., classification probabilities 222 and/or 224) may be assigned and maintained for subsequent frames in the media file (e.g., frame 212 and/or frame 214). In various embodiments, the classification probabilities for the subsequent frames may be used to adjust, update, or rescore the probabilities maintained for previous frames. For instance, if a classification probability 220 is being maintained for frame 210, this classification probability 220 may be adjusted based on classification probabilities assigned and maintained for frames subsequent in time, such as frame 212 (classification probability 222) and/or frame 214 (classification probability 224). That is, the probability for a particular frame (e.g., frame 210) may be reallocated based on probabilities assigned to subsequent frames (e.g., frame 212 and/or frame 214). Therefore, a VAD or probability decision for a particular frame may be made based at least in part on a frame window that may include one or more frames prior to that frame and/or one or more frames subsequent to that frame. Accordingly, a context surrounding that particular frame may be used to assign a probability to that frame and/or make a VAD decision regarding that frame.

In particular, the VAD module 102 may utilize a decoding search space, meaning that the VAD module 102 may maintain a network of decoding hypotheses. For instance, at any given frame, the VAD module 102 may maintain one or more guesses and associated probabilities (i.e., network paths) for the classification of that frame. As additional frames are processed by the VAD module 102, those network paths may be extended and the network probabilities may be updated. Therefore, for a particular frame t, the best path may be path A. However, at a later time, the best path may now be path B, which may now have a better total probability than path A.

In various embodiments, the window described above may be utilized to change the classification probability of a particular frame based on a probability and/or a VAD decision of a frame previous in time. For instance, using the above example, assume that a classification probability 220 of frame 210 including speech is 0.7 while a classification probability 220 of frame 210 including non-speech is 0.3. Moreover, further assume that a classification probability 218 of frame 208 including speech and non-speech is 0.3 and 0.7, respectively. Therefore, given these probabilities, there appears to be a greater likelihood that frame 208 includes non-speech as opposed to speech. Since a preceding frame (e.g., frame 208) may be more likely to be non-speech, the classification probability 210 of frame 210 including speech may be downgraded. For example, because there now may be an increased likelihood that frame 210 is non-speech, the previously assigned classification probability 220 of frame 210 being speech may be downgraded from 0.7 to 0.5 and the classification probability 220 of frame 210 being non-speech may be increased from 0.3 to 0.5. However, it is contemplated that the classification probabilities 220 associated with frame 210 may be increased and/or decreased by any amount and in any manner.

In other embodiments, the amount of increase and/or decrease of the classification probabilities may be based on the specific classification probabilities of the prior frame (e.g., frame 208). Using the example above, if the classification probability 218 of frame 208 being speech is instead 0.1 and the classification probability 218 of frame 208 being non-speech is 0.9, the classification probability 218 of frame 208 being non-speech is relatively high (e.g., 90%). Therefore, since a preceding frame 208 is likely to include non-speech, there may be a greater likelihood that frame 210 also includes non-speech. As a result, the classification probability 220 of frame 210 including non-speech may be decreased even further (e.g., from 0.7 to 0.3). Likewise, if the classification probability 218 of frame 208 being speech is 0.9 and the classification probability 218 of frame 208 being non-speech is 0.1, the classification probability 220 of frame 210 being speech may be increased (e.g., from 0.7 to 0.8).

Furthermore, it is also contemplated that the classification probability of a particular frame being speech/non-speech may also be based on a VAD decision for a previous frame. For example, if frame 208 is determined to include speech, the classification probability 220 of frame 210 being speech may be increased. On the contrary, if frame 208 is determined to be non-speech, the classification probability 220 of frame 210 being non-speech may be increased. In other words, if a particular frame (e.g., frame 208) has been designated as speech or non-speech, there may be a higher likelihood that a subsequent frame (e.g., frame 210) is speech or non-speech, respectively. In various embodiments, the classification probability 220 associated with the current frame 210 may be adjusted based on a closeness in time between the prior frame 208 and the current frame 210. For instance, a greater adjustment to this probability may be made if the prior frame 208 is determined to be adjacent in time to the current frame 210.

In another embodiment, a VAD decision associated with one frame may be adjusted based on VAD decisions associated with frames subsequent in time. For instance, assume that frame 210 was previously determined to include speech but the next one or more frames (e.g., frame 212 and/or frame 214) are determined to be non-speech, the system 200 may re-classify frame 210 as non-speech. The reason being that if the next n seconds of frames (e.g., frame 212 and/or frame 214) are classified as speech or non-speech, there may be a higher likelihood that a previous frame (e.g., frame 210) is also speech or non-speech, respectively. Therefore, as shown above, the VAD module 202 may utilize VAD decisions for one or more frames to determine whether a VAD decision associated with a previously classified frame should be adjusted or re-classified. In various embodiments, adjusting a VAD decision for a particular frame based on VAD decisions for subsequent frames may be performed by a Viterbi decoder, which may use the Viterbi algorithm.

As mentioned previously, the VAD module 202 and the speech recognizer may process the media file 204 asynchronously, meaning that the VAD module 202 and the speech recognizer may process the media file 204 at different times. In one embodiment, the VAD module 202 may process frames 206-214 of the media file 204 before the speech recognizer. For instance, the VAD module 202 may determine whether each frame 206-214 of the media file 204 is speech or non-speech and make such a classification. For each of frames 206-214 that were determined to include speech, the speech recognizer may then convert the spoken words into text, which may result in a text transcript of the media file 204.

A larger asynchronicity between the VAD module and the speech recognizer may cause the VAD module to have a greater look-ahead associated with the media file 204. The look-ahead may refer to the number of frames 206-214 that the VAD module 202 has processed before those frames 206-214 are processed by the speech recognizer. Alternatively, the look-ahead may refer to a difference in time corresponding to when the VAD module 202 and the speech recognizer process the same frame of the media file 204. Therefore, the greater the look-ahead may mean that the VAD module 202 is more likely to use probabilities and/or VAD decisions of one or more frames to correct or adjust prior incorrect or inaccurate VAD decisions. In various embodiments, because the VAD module 202 may process frames 206-214 of the media file 204 prior to the speech recognizer, the VAD module 202 may correct previous VAD decisions before the frames 206-214 associated with those VAD decisions are processed by the speech recognizer. Therefore, the more time the speech recognizer can wait to process frames 206-214 of the media file 204, the greater likelihood that the VAD module 202 can make more robust VAD decisions. If the VAD module 202 is able to correct or adjust previous VAD decisions, the speech recognizer may process VAD decisions that more accurately represent the media file 204. As a result, the transcript generated by the speech recognizer may be more accurate, include less errors, and/or reflect the actual content included in the media file 204.

In various embodiments, the system 200, such as a system for online large vocabulary continuous speech recognition (LVCSR), may be combined with a Finite States Transducer (FST) driven VAD. For the purposes of this discussion, a FST may refer to a finite state machine having two storage media (e.g. tapes)—an input storage media (e.g., input tape) and an output storage media (e.g., output tape). In the above embodiment, for each frame 206-214, a state of the FST may be updated without assigning a VAD label or classification. Moreover, assuming that the system 200 includes a look-ahead of A frames for delta feature computation and short-term feature normalization, in order to decode frame t, which is the front-end of the media file 204, the VAD FST may be advanced to frame t+Δ. When a feature vector for frame t is requested by the VAD module 202 and/or the speech recognizer, a VAD decision for frame t may also be requested. At this point, a VAD FST trace-back may be examined and the best VAD decision for frame t may be returned. This may implicitly introduce look-ahead smoothing into the VAD decision since frames beyond t may alter the best trace-back path. In various embodiments, look-ahead smoothing may refer to adjusting a probability or a VAD determination associated with a frame based at least in part on subsequent frames of the media file 204. Moreover, if the look-ahead window is somehow reduced, there may be less benefit from look-ahead smoothing and no changes to models or decision rules may be made.

In various embodiments, and with respect to non-speech, at least two types of silence may be included. End-of-utterance may refer to when an individual has finished speaking a word and/or a sentence whereas end-of conversation may refer to when an individual is finished speaking. In various embodiments, the VAD module may declare end-of-utterance after only a few frames of silence, but may wait for many more frames before declaring end-of-conversation. The reason for the difference is that conversations frequently include pauses of various lengths. Moreover, waiting for a longer period of silence before declaring an end-of-conversation may improve the accuracy of such declarations. Furthermore, the VAD module 202 may not incur additional lag in order to confirm that the speaker is finished speaking. On the other hand, the VAD module 202 may be able to sacrifice an additional likelihood of error and declare an end-of-utterance so that a conversation between two or more people may be accurately reflected in the resulting transcript. If the VAD module 202 and the speech recognizer are processing frames 206-214 of the media file 204 asynchronously, initially incorrect end-of-utterance and end-of-conversation decisions may be corrected prior to the speech recognizer processing frames 206-214. Accordingly, a larger disjoint in time 226 between the VAD module 202 and the speech recognizer may allow for more robust VAD decisions and, therefore, a more accurate transcript associated with the media file 204.

Implementing Direct Model Adaptation and Look-Ahead Feedback

In various embodiments, any VAD algorithm known in the art may be used to implement the techniques described above. For instance, a Hidden Markov Model (HMM)-based VAD with speech recognizer feedback may be utilized to demonstrate leveraging feedback from a speech recognizer.

In HMM-based VAD, a Maximum Likelihood criteria may be used to align a multi-state fully-connected HMM against input speech. The resulting state alignment may give a VAD class for each frame. The VAD class may relate to a determination of whether the frame includes speech and/or non-speech. In one embodiment, a two-state HMM may be used, one state each for speech and non-speech. In this embodiment, for the VAD decision for $y_t$, which may correspond to the t of an observed noisy signal (e.g., the media file 204 or a portion thereof), may be given by the label of the occupied state at that time, and governed by the following hypotheses, as shown in Equations 1 and 2:

$$H_0(\text{speech absent}): y_t = n_t \quad (1)$$

$$H_1(\text{speech present}): y_t = x_t + n_t, \quad (2)$$

where $n_t$ and $x_t$ may refer to noise and active speech, respectively. In various embodiments, the HMM states may be modeled by statistical distributions. In one embodiment, a multi-variate Gaussian function may be used, with a diagonal covariance matrix under the weak assumption of independent Gaussian random variables, as shown in Equation 3:

$$p(y_t \mid H_k) = \frac{1}{\sqrt{(2\pi)^n |\Sigma_k|}} \exp^{-\frac{1}{2}(y_t - \mu_k)^T \Sigma_k^{-1}(y_t - \mu_k)}, \quad (3)$$

where $\mu_k$ and $\Sigma_k$ may represent parameters of the speech/non-speech states. Moreover, the initial values of the above parameters may be trained on reference segmented noisy data.

In other embodiments, online VAD may be performed using the Viterbi algorithm to align the HMM states to the input signal. For a speech recognizer (e.g., LVCSR), a front-end feature extractor and a back-end decoder of the speech recognizer may operate concurrently. Per each frame t, the speech recognizer may request a speech feature vector, $o_t$, for frame t. To compute $o_t$, the front-end feature extractor may extract up to $o_t + \Delta$, where $\Delta$ may be governed by the requirements for delta/acceleration computation, short-term feature normalization, or application latency, for example. Moreover, the VAD may be decoded for frame t+Δ and the back-end decoder may request the VAD decision for frame t. Subsequently, the best-path in the Viterbi network at time t+Δ may be extracted, and the path may be traced back to find which state was active at that time. Furthermore, smoothing may be applied on the Viterbi best-path decisions to remove short speech/non-speech segments. The label of that state may further be emitted as the VAD decision (e.g., speech or non-speech) for that time.

In various embodiments, an end-of-utterance may be declared when N consecutive frames of non-speech are identified. Moreover, requesting the VAD label for frame t at a later time may result in a different label if the Viterbi best-path has changed. For instance, the label associated with a particular frame may change based on VAD decisions and/or probabilities associated with prior frames and/or subsequent frames.

In a further embodiment, at the end of an utterance, the speech recognizer may emit a speech recognition lattice. Using the speech recognition lattice, the speech recognizer may compute a confidence score for each word on the lattice best-path using the following word posterior, as shown in Equation 4:

$$p(w_i | Y) = \frac{\sum_{\pi | w_i \in \pi} \{p(Y|\pi)\}^\alpha P_{LM}(\pi)}{\sum_\pi \{p(Y|\pi)\}^\alpha P_{LM}(\pi)}, \quad (4)$$

where $w_i$ may refer to the word edge on the best-path, $\pi$ may represent a path in the speech recognition lattice, $P_{LM}(\pi)$ may correspond to a language model probability of the word sequence path $\pi$, $p(Y|\pi)$ may refer to an acoustic likelihood of the observation sequence Y for the utterance, and $\alpha$ may represent an acoustic scaling factor. The confidence score may represent a likelihood that the words transcribed by the speech recognizer are representative of what is being spoken. Moreover, Equation 4 may represent a sum of all paths that span edge $w_i$ divided by the sum of all lattice paths. The confidences of edges with the same word label may be combined and then, each frame in the best path edges with a confidence above a threshold may be selected as adaptation frames.

In particular, for the best path sequence $B=[(w_j, p_j, s_j, e_j)]$, that may correspond to a word label, confidence, start time, and end time, respectively, the frames for adaptation may be selected as shown in Equations 5 and 6:

$$A(H_o)=[(s_j,e_j)|p_j>\rho \text{ AND } w_j \text{ is non-speech}] \quad (5)$$

$$A(H_1)=[(s_j,e_j)|p_j>\rho \text{ AND } w_j \text{ is speech}] \quad (6)$$

Maximum A Posteriori (MAP) adaptation may be used to update VAD model parameters, which for a Gaussian distribution, is the following weighted combination, as shown in Equation 7:

$$N(\hat{\mu}_k,\hat{\Sigma}_k) \leftarrow N(\mu_k^o,\rho_k^o)+\tau N(\tilde{\mu}_k,\tilde{\Sigma}_k) \quad (7)$$

where $N(\mu_k^o,\rho_k^o)$ may be the original distribution estimated from training data, $N(\tilde{\mu}_k,\tilde{\Sigma}_k)$ may be estimated from all frames seen since t=0 (e.g., not just those for the current utterance), $N(\hat{\mu}_k,\hat{\Sigma}_k)$ may correspond to the new distribution, and r may correspond to the MAP adaptation weight. The adapted VAD models may be used going forward and models may be reset to the original trained models at either the end of a conversation and/or speaker interaction.

In various embodiments, experimentation may be conducted on speech, such as telephone speech, to evaluate VAD frame classification error rate and speech recognition. More particularly, noisy recordings may be created by mixing clean signals with various types of real-world noise, such as noises associated with a vehicle (stationary), a restaurant (babble), a street (non-stationary), and a subway (periodic noise), for example. The noise recordings may be re-sampled to a predetermined frequency and then partitioned into training and testing noise samples. The noise-corrupted training and test sets may be artificially created by mixing a weighted noise signal with a clean speech signal. Therefore, a Signal-to-Noise Ratio (SNR) may be defined as the ratio of the active speech energy of the clean signal s(t) to the energy of the corresponding segments from the noise n(t), as shown in Equation 8:

$$SNR \equiv 10\log_{10}\frac{\sum_{t=1}^{T}s^2(t)r(t)}{\sum_{t=1}^{T}n^2(t)r(t)}, \quad (8)$$

where r(t) may correspond to an active speech mask from the reference segmentation. In particular, r(t)=1 when the clean signal is active and, otherwise, r(t)=0.

Given a set of training speech arising from conversation sides mixed with the training noises (e.g., vehicle, restaurant, etc.) at different SNRs, a noise mixing weight may be calculated per side and the active speech mask r(t) may be taken from speech utterance boundaries provided in word transcripts of the data. In various embodiments, the reference segmentation may not include non-speech frames at the beginning and end of speech segments. The speech and noise HMM states may then be trained using the multi-condition training procedure as illustrated in Equation 8. Evaluations may then be done on various conversations, meaning that noise-corrupted speech may be created using the same procedure as used for the training speech such that there is one clean version and multiple noisy versions of each conversation side. Moreover, the sides from the same conversation may be combined to a single mixed channel and then noisy versions may also be created. Furthermore, the speech recognizer may use a look-ahead window of a predetermined time (e.g., 0.5 seconds) for feature normalization and/or look-ahead and a predetermined confidence threshold ($\rho$) may be used to select frames for feedback adaptation.

In view of the foregoing, VAD may be evaluated using an average classification error rate, as shown by Equation 9:

$$E = \frac{1}{k}\sum\frac{E_k}{N_k}, \quad (9)$$

where $N_k$ and $E_k$ may denote the total number of frames and the number of the incorrectly classified frames, respectively, for a test file k and K is some parameter. Furthermore, reference frame classification may be taken from the speech segmentation of evaluation data word transcripts. Since speech recognition may not require strict speech/non-speech boundaries, smoothing of the VAD decisions may be applied. That is, VAD decisions for a particular frame may be adjusted or rescored based at least in part on prior and subsequent VAD decisions, as described above. For instance, speech segments less than a certain threshold (e.g., 0.05 seconds) may be changed to non-speech whereas non-speech segments less than a different threshold (e.g., 0.1 seconds) may be changed to speech.

Utilizing Equation 9, the directing model adaptation feedback and/or the look-ahead feedback techniques, as described above, classification error rates corresponding to incorrectly classifying frames as speech or non-speech may be significantly reduced. Therefore, by leveraging feedback from the speech recognizer and/or by utilizing a look-ahead window, the VAD module and the speech recognizer may become more robust. As a result, a text transcript corresponding to the file being processed by the VAD module and the speech recognizer may be more accurate and representative of this file.

Example Computing Environment

Figure 3:
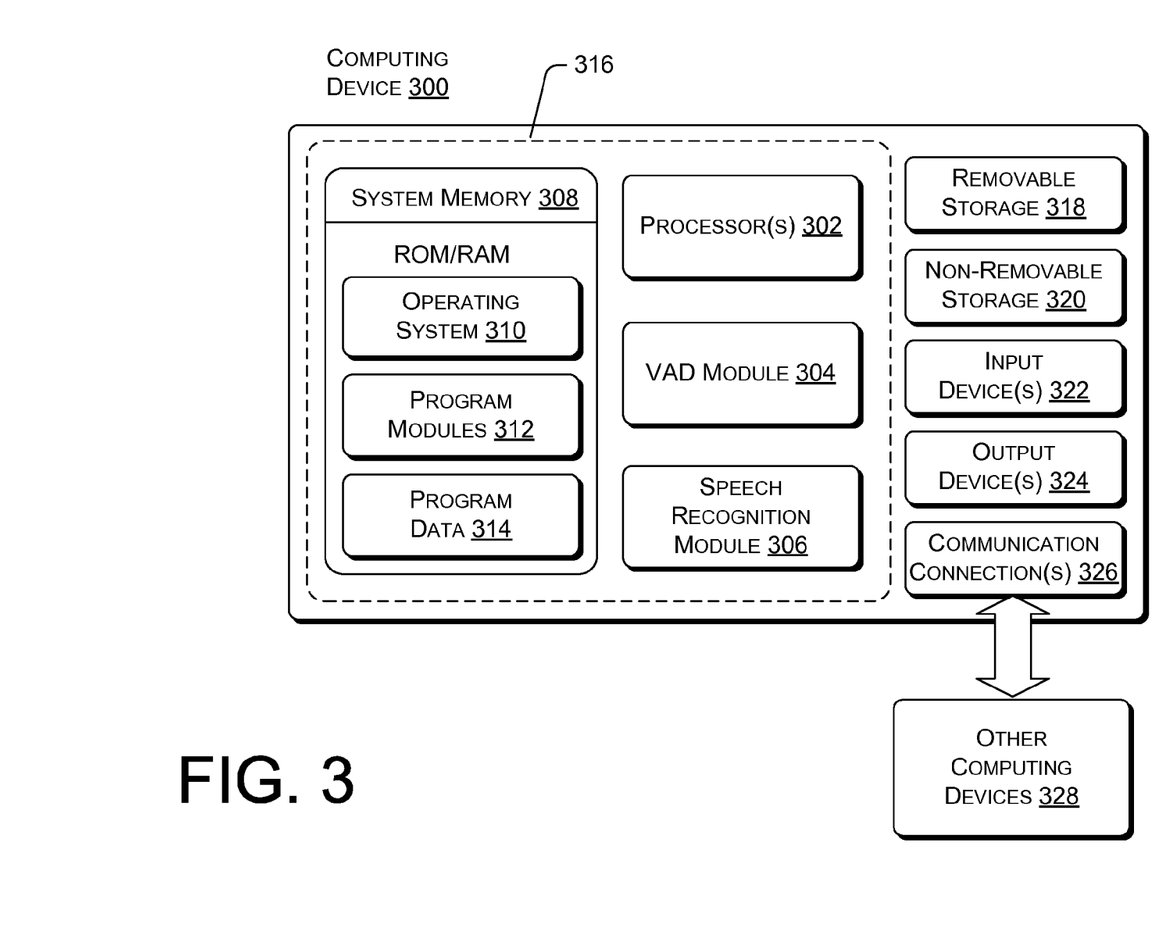
FIG. 3 is a block diagram that illustrates a representative computing device that may implement the voice activity detection methods described herein, in accordance with various embodiments.

FIG. 3 illustrates a representative computing device 300 that may implement the VAD techniques described herein, in accordance with various embodiments. The techniques and mechanisms described herein may be implemented by multiple instances of computing device 300 as well as by any other computing device, system, and/or environment. The computing device 300 shown in FIG. 3 is only one example of a computing device and is not intended to suggest any limitation as to the scope of use or functionality of any computing device utilized to perform the processes and/or procedures described above.

In at least one configuration, the computing device 300 includes at least one processor 302, a VAD module 304, a speech recognition module 306, and system memory 308. The processor(s) 302 may execute one or more modules and/or processes to cause the computing device 300 to perform a variety of functions. In some embodiments, the processor(s) 302 are a CPU, a GPU, both CPU and GPU, or other processing units or components known in the art. Additionally, each of the processor(s) 302 may possess its own local memory, which also may store program modules, program data, and/or one or more operating systems.

The VAD module 304 may correspond to VAD module 102 and/or VAD module 202. In various embodiments, and as described above with respect to FIGS. 1 and 2, the VAD module 304 may determine whether frames of a media file include speech or non-speech and classify the frames as either speech frames or non-speech frames. Moreover, the VAD module 304 may utilize feedback provided by the speech recognition module 306 to improve VAD for frames not yet processed by the VAD module 304. In various embodiments, the VAD module 304 and the speech recognition module 306 may process the media file asynchronously such that the VAD module 304 processes frames of the media file prior to the speech recognition module 306.

In other embodiments, the VAD module 304 may utilize a look-ahead window to improve VAD of a media file. More particularly, the VAD module 304 may assign and maintain a probability (e.g., classification probability) of whether a first frame of a media file includes speech or non-speech. Furthermore, the VAD module 304 may update the previously maintained probability based at least in part on probabilities associated with one or more additional frames of the media file that are either prior to or subsequent to the first frame. The VAD module 304 may also delay a VAD decision corresponding to the first frame until the probability corresponding to the first frame is updated, which may improve the robustness of VAD of the media file.

The speech recognition module 306 may correspond to the speech recognizer 104. In some embodiments, once the VAD module converts frames of a media file into speech frames and/or non-speech frames, the speech recognition module 306 may convert the words and non-speech included in the speech frames and the non-speech frames, respectively, into a text transcript representative of the media file. As stated above with respect to FIGS. 1 and 2, the speech recognition module 306 may transmit feedback to the VAD module 304 in order to increase the accuracy of VAD. In various embodiments, the VAD module 304 and the speech recognition module 306 may reside on the same computing device 300 or may reside on separate devices.

Depending on the exact configuration and type of the computing device 300, the system memory 308 may be volatile (such as RAM), non-volatile (such as ROM, flash memory, miniature hard drive, memory card, or the like) or some combination thereof. The system memory 308 may include an operating system 310, one or more program modules 312, and may include program data 314. The computing device 300 is of a very basic configuration demarcated by a dashed line 316.

The computing device 300 may have additional features and/or functionality. For example, the computing device 300 may also include additional data storage devices (removable and/or non-removable) such as, for example, magnetic disks, optical disks, or tape. Such additional storage is illustrated in FIG. 3 by removable storage 318 and non-removable storage 320. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 308, the removable storage 318 and the non-removable storage 320 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 300. Any such computer storage media may be part of the computing device 300. Moreover, the computer-readable media may include computer-executable instructions that, when executed by the processor(s) 302, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 300 may also have input device(s) 322 such as a keyboard, a mouse, a pen, a voice input device, a touch input device, etc. Output device(s) 324, such as a display, speakers, a printer, etc. may also be included.

The computing device 300 may also contain communication connections 326 that allow the device to communicate with other computing devices 328, such as over a network. These networks may include wired networks as well as wireless networks. The communication connections 326 are some examples of communication media, as described above. For the purposes of this discussion, the other computing devices 328 may include computing devices similar to computing device 300, servers, and/or any other type of device known in the art.

It is appreciated that the illustrated computing device 300 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, including remote servers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

Example Processes

Figure 4:
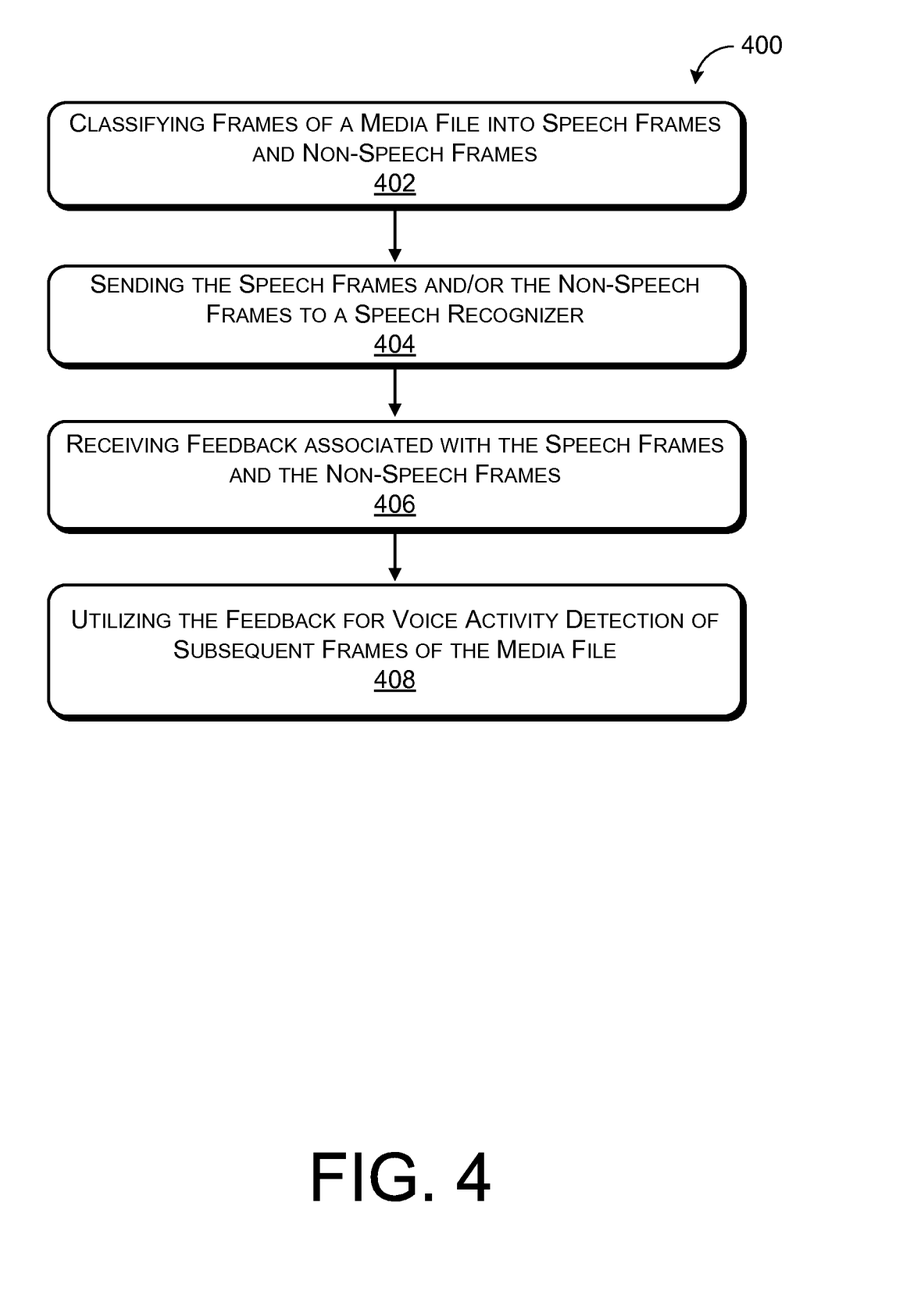
FIG. 4 illustrates a flowchart showing an illustrative process to utilize feedback from a speech recognizer to guide voice activity detection.
Figure 5:
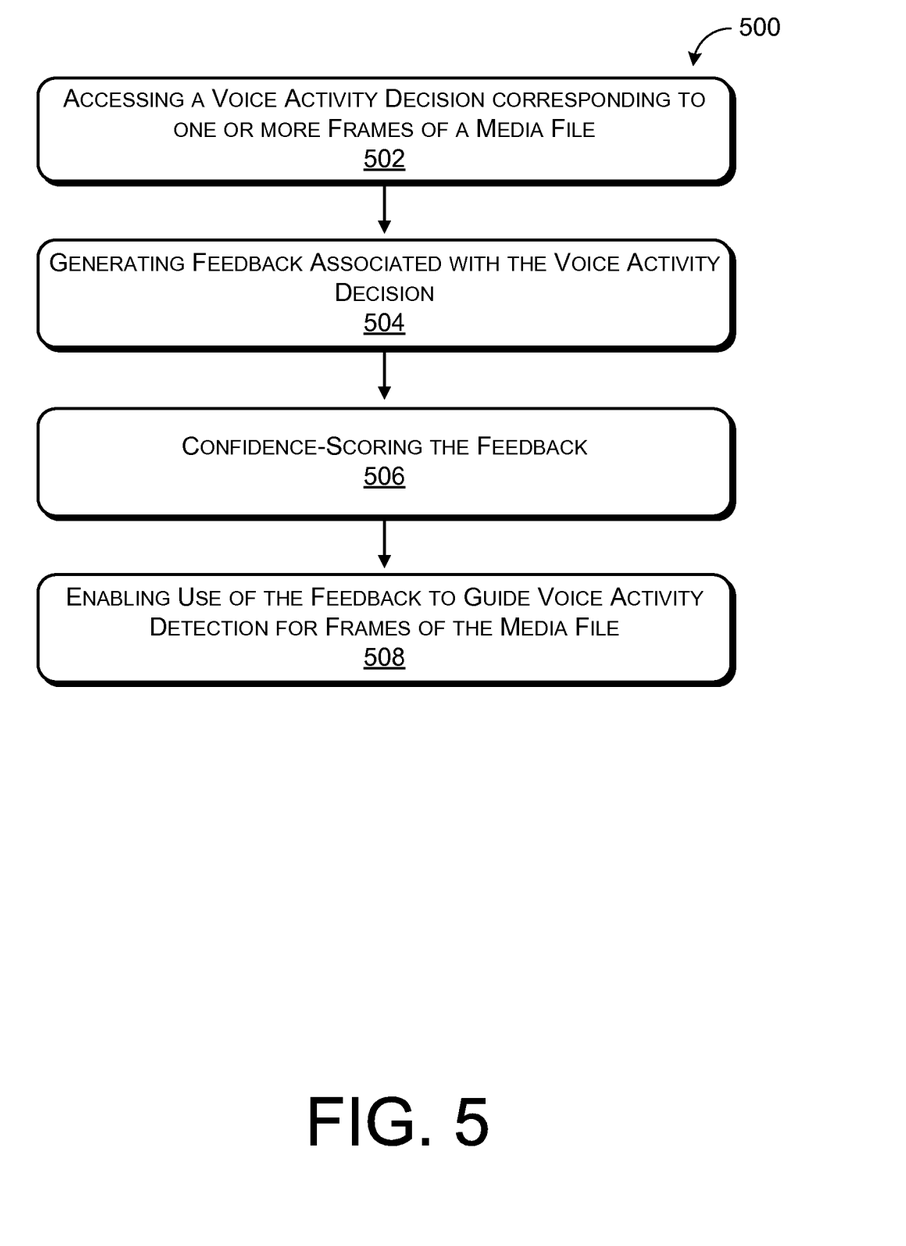
FIG. 5 illustrates a flowchart showing an illustrative process to provide feedback associated with a voice activity decision to guide voice activity detection.
Figure 6:
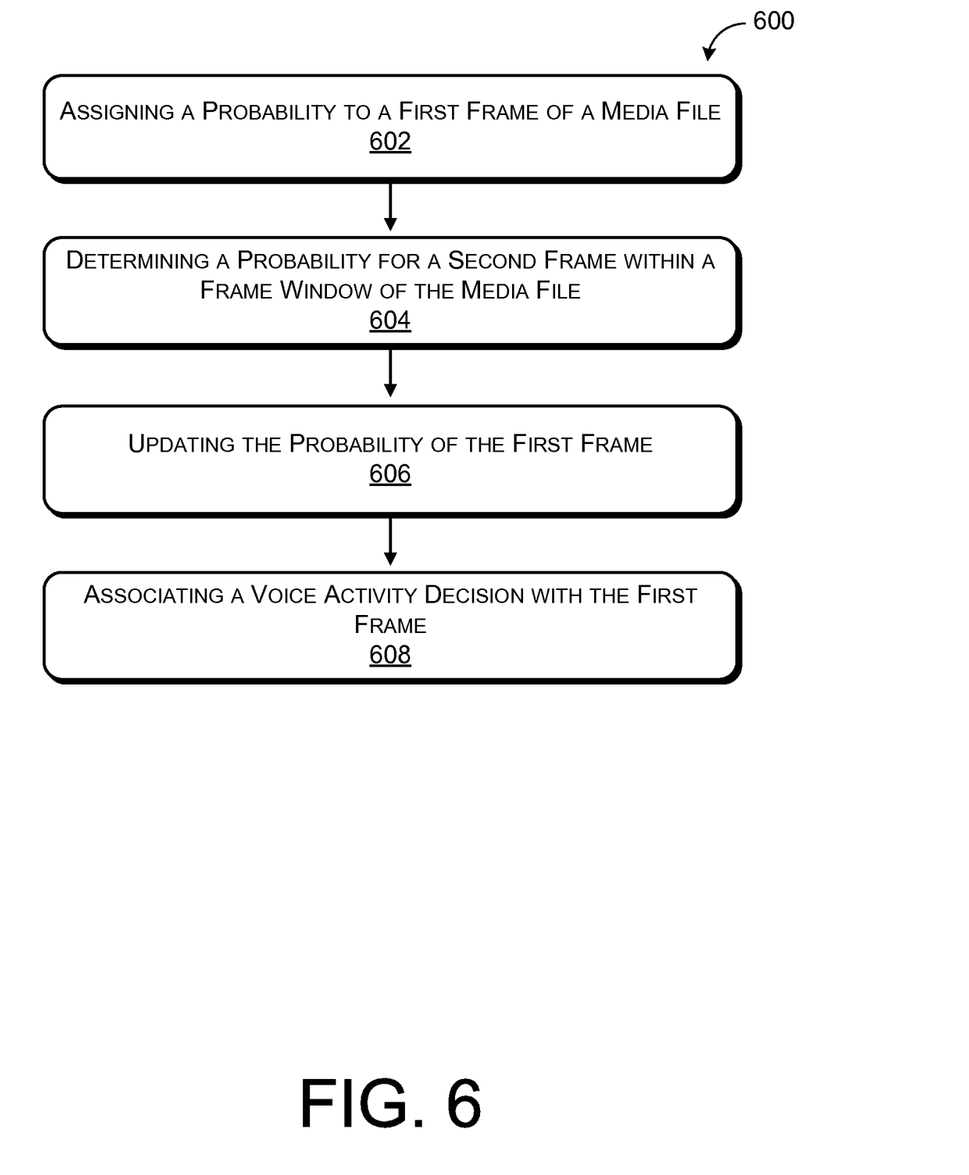
FIG. 6 illustrates a flowchart showing an illustrative process to utilize a look-ahead window to update a probability of a frame of a media file.

FIGS. 4-6 describe various example processes for leveraging feedback from a speech recognizer to improve VAD. The example processes are described in the context of the environment of FIGS. 1-3, but are not limited to those environments. The order in which the operations are described in each example process is not intended to be construed as a limitation, and any number of the described blocks can be combined in any order and/or in parallel to implement each process. Moreover, the blocks in the FIGS. 4-6 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flowchart illustrating a process 400 of utilizing feedback from a speech recognizer to guide VAD. In an example embodiment, the following actions associated with FIG. 4 may be performed by VAD module 102, VAD module 202, and/or VAD module 304 described above with respect to FIGS. 1-3, respectively.

Block 402 illustrates classifying frames of a media file into speech frames and non-speech frames. In one embodiment, the frames of the media file may correspond to any one of frames 112-120 and the media file may correspond to the first thread 102 that is may be processed by the VAD module. As the VAD module processes the media file, it may determine whether each frame of the media file contains speech or non-speech, such as silence or other noise. The VAD module may then classify frames of the media file as either speech frames or non-speech frames.

Block 404 illustrates sending the speech frames and/or the non-speech frames to a speech recognizer. The speech frames and/or the non-speech frames may correspond to the voice activity decision (e.g., 122, 124, 128, and/or 130) shown in FIG. 1. In one embodiment, once the VAD module classifies the frames as having either speech or non-speech, the VAD module may send the speech frames and/or the non-speech frames to the speech recognizer described above with respect to FIGS. 1 and 2. Alternatively, instead of transmitting each frame, the VAD module may transmit an indication that one or more frames include speech and/or non-speech. In various embodiments, a frame identifier may be utilized to identify whether various frames of the media file include speech and/ or non-speech. Furthermore, the speech recognizer may request the speech frames and/or the non-speech frames from the VAD module. In other embodiments, the speech recognizer may access the speech/non-speech frames without sending such a request.

Block 406 illustrates receiving feedback associated with the speech frames and the non-speech frames. In various embodiments, the feedback may correspond to directed feedback 126 or directed feedback 132, as illustrated in FIG. 1. Moreover, the feedback may be transmitted from the speech recognizer 104 and/or the speech recognition module 306 and the feedback may be received by VAD module 102, VAD module 202, and/or VAD module 304. Upon receiving the speech/non-speech frames from the VAD module, the speech recognizer may convert the words and silence/noise corresponding to the speech frames and the non-speech frames, respectively, into a text transcript. Therefore, the text transcript may represent the content of the media file.

The text transcript created by the speech recognizer may also be confidence-scored, whereby the confidence-scores of words included in the text transcript may represent a level of accuracy of the text transcript with respect to the actual content of the media file. Moreover, the text transcript may be confidence-scored such that the transcript includes transcribed portions of the media file that exceed a predetermined threshold of reliability. In various embodiments, this threshold may be set to any value.

Block 408 illustrates utilizing the feedback for voice activity detection of subsequent frames of the media file. More particularly, and in various embodiments, the VAD module may utilize the text transcript and/or other information/feedback provided by the speech recognizer in order to improve VAD. For instance, the feedback from the speech recognizer may be leveraged by the VAD module to update one or more models of the VAD module. The updated models may then be utilized by the VAD module to improve the accuracy of VAD for frames of the media file that have yet to be processed by the VAD module.

In addition, the VAD module and the speech recognizer may process the media file asynchronously, meaning that the VAD module may process frames of the media file prior to the speech recognizer. Since the VAD module may process frames of the media file before the speech recognizer, the VAD module may improve the robustness of its VAD before the speech recognizer processes those frames. As a result, the text transcript generated by the speech recognizer may be less likely to include errors and, therefore, may be a more accurate representation of the speech included in the media file.

FIG. 5 is a flowchart illustrating a process 500 of enabling the use of feedback to guide VAD. In an example embodiment, the following actions associated with FIG. 5 may be performed by the speech recognizer 102 and/or the speech recognition module 306, as described above with respect to FIGS. 1-3.

Block 502 illustrates accessing a voice activity decision corresponding to one or more frames of a media file. In various embodiments, the voice activity decision may correspond to voice activity decision 122, voice activity decision 124, voice activity decision 128, and/or voice activity decision 130. Moreover the media file may correspond to the second thread 104 that may be processed by the speech recognizer and the frames may correspond to frames 114-120. In a different embodiment, the voice activity decision may be generated by the VAD module (e.g., VAD module 102, VAD module 202, and/or VAD module 304) and be based on a determination of whether the one or more frames include speech (e.g., speech frames) or non-speech (e.g., non-speech frames). Moreover, the speech recognizer may either request the voice activity decision or otherwise access the voice activity decision without submitting a request.

Block 504 illustrates generating feedback associated with the voice activity decision. Once the speech recognizer has access to the voice activity decision, the speech recognizer may convert the content included in the speech frames and/or non-speech frames into a text transcript. Furthermore, the feedback associated with the voice activity decision may represent a relative accuracy of the voice activity decision. In other words, the feedback may indicate whether the text transcript is an accurate representation of the speech and/or non-speech included in the media file.

Block 506 illustrates confidence-scoring the feedback. In various embodiments, the text transcript may be confidence-scored such that the text transcript includes words that exceed a predetermined threshold with respect to reliability. It is contemplated that this threshold may be set to any value. Further, the text transcript may be confidence-scored such that the confidence score may indicate a likelihood of the text transcript being accurate.

Block 508 illustrates enabling use of the feedback to guide voice activity detection for frames of the media file. In various embodiments, once generated, the feedback (e.g., the text transcript) may be transmitted from the speech recognizer to the VAD module. The feedback may also correspond to directed feedback 126 and/or directed feedback 132, as shown in FIG. 1. The VAD module may utilize this feedback to update one or more models used for VAD. Therefore, subsequent frames of the media file not yet processed by the VAD module may be processed using the updated models. In various embodiments, the feedback provided by the speech recognizer may indicate a level of accuracy of the VAD module in its classification of frames as either speech frames or non-speech frames. Therefore, by updating its models, the VAD module may provide more accurate VAD determinations for subsequent frames of the media file. Furthermore, the VAD module and the speech recognizer may process the media file asynchronously, meaning that the VAD module may process portions of the media file prior to the speech recognizer.

FIG. 6 is a flowchart illustrating a process 600 of improving VAD based at least in part on a look-ahead window. In an example embodiment, the following operations associated with FIG. 6 may be performed by VAD module 102, VAD module 202, and/or VAD module 304, as described above with respect to FIGS. 1-3.

Block 602 illustrates assigning a probability to a first frame of a media file. In various embodiments, the media file may correspond to media file 204 and the first frame may correspond to any one of frames 206-214. Furthermore, the VAD module may process the media file 204 by determining a probability (e.g., classification probabilities 216-224) for each of the frames. More particularly, the VAD module may assign a probability to a first frame (e.g., frame 210) that represents a likelihood that the first frame either does or does not includes speech. For instance, the VAD module may assign a probability of 0.7 that the first frame includes speech, meaning that there is approximately a 70% likelihood that the first frame includes speech and a 30% likelihood that the first frame includes non-speech (e.g., silence, other noise, etc.).

In an example embodiment, the VAD module may assign probabilities to each of the frames of the media file without making a VAD determination at that time. That is, the VAD decision may be delayed until it needs to be made. Moreover the probability that a frame includes speech and the probability that the frame includes non-speech may be inversely related. For instance, assuming the probability for speech is 0.7, the probability for non-speech would be 0.3. Likewise, if the probability for speech was determined to be 0.8, the probability for non-speech would be 0.2, and so on.

Block 604 illustrates determining a probability for a second frame within a frame window of the media file. More particularly, the VAD module may determine and maintain a probability of a second frame that also corresponds to a likelihood that the second frame includes speech versus non-speech. The frame window may also be referred to as a look-ahead window and may represent one or more frames of the media file before (e.g., frame 206 and/or frame 208) and/or subsequent to (e.g., frame 212 and/or frame 214) the first frame. Therefore, the VAD module may determine probabilities for multiple frames of the media file.

Block 606 illustrates updating the probability of the first frame. As described above with respect to FIG. 2, the VAD module may update the probability that the first frame includes speech/non-speech based at least in part on the probability associated with the second frame. For example, assuming that it is determined that the first frame is more likely to be speech but that the second frame is more likely to be non-speech, the probability that the first frame includes speech may be decreased or downgraded. That is, since a frame before or after (e.g., adjacent to) the first frame is more likely to be non-speech, there may be a higher likelihood that the first frame includes non-speech. As a result, the probability that the first frame includes speech may be decreased. As a result, the probability that the first frame includes non-speech may therefore be increased.

As stated above, the probability of the first frame may be adjusted based on a probability of any other frame of the media file, such as one or more frames included in the frame window. For instance, the second frame may be before or after the first frame and/or adjacent or non-adjacent to the first frame. Since the probability maintained for the first frame may be adjusted after the probability is initially assigned, the VAD module may make adjustments to this probability based on a context of frames surrounding the media file. With this additional information, the VAD module may be able to make a more accurate decision regarding whether any frame includes speech or non-speech.

Additionally, and in various embodiments, the VAD module may delay assigning a VAD decision for a particular frame until the probability associated with that frame has been updated. Therefore, to help ensure that the VAD decision is correct and/or accurate, the VAD module may determine a context of frames surrounding that particular frame and make a VAD decision accordingly.

Block 608 illustrates associating a voice activity decision with the first frame. In various embodiments, the VAD decision may correspond to voice activity decision 122, voice activity decision 124, voice activity decision 128, and/or voice activity decision 130, as shown in FIG. 1. Moreover, the voice activity decision may represent whether that frame (e.g., frame 210) of the media file includes speech or non-speech (e.g., silence, other noise, etc.). The VAD module may also make voice activity decisions for one or more additional frames (e.g., frames 206, frame 208, frame 212, and/or frame 214) of the media file. Subsequently, the VAD module may utilize the voice activity decisions associated with the one or more additional frames to adjust or change the voice activity decision associated with the first frame. For instance, if the first frame was determined to include speech but one or more subsequent frames were determined to include non-speech, there may be a higher likelihood that the first frame also includes non-speech. Accordingly, the VAD module may change the voice activity decision for the first frame from speech to non-speech. In one embodiment, the one or more additional frames may be before or after the first frame and possibly adjacent to the first frame.

Since the voice activity decision for a particular frame may be adjusted after it is initially determined, there may be a greater likelihood that the VAD module makes more accurate and robust decisions regarding whether frames of a media file include speech or non-speech. As a result, the feedback and/or text transcript generated by the speech recognizer may more accurately represent the actual content (e.g., conversation, speech, etc.) included in the media file. Subsequently, this feedback may be leveraged by the VAD module to make VAD determinations for additional frames of the media content not yet processed by the VAD module.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
under control of one or more computing devices comprising one or more processors,
classifying, by a VAD module, a plurality of frames of a media file into one or more speech frames and one or more non-speech frames;
receiving feedback associated with the one or more speech frames and the one or more non-speech frames, the feedback including a determination of accuracy of classifying one or more frames of the media file that are located at a predetermined time before the plurality of frames of the media file or that are selected based on a predetermined condition, the feedback being generated by a speech recognizer, the VAD module and the speech recognizer processing the media file asynchronously; and
utilizing the feedback to update a model to be used for voice activity detection (VAD) of a plurality of frames of the media file yet to be processed.

2. A method as recited in claim 1, wherein the classifying includes identifying whether each of the plurality of frames of the media file includes speech or non-speech.

3. A method as recited in claim 1, further comprising sending the one or more speech frames and the one or more non-speech frames to a speech recognizer.

4. A method as recited in claim 1, further comprising classifying additional frames of the plurality of frames prior to receiving the feedback.

5. A method as recited in claim 1, wherein the feedback includes a text transcript representing a content of the one or more speech frames.

6. A method as recited in claim 5, wherein the text transcript is confidence-scored based at least in part on the accuracy of the classifying.

7. A method as recited in claim 6, wherein the confidence-scored text transcript includes words or phrases of the media file that exceed a predetermined threshold of reliability.

8. A method comprising:
under control of one or more computing devices comprising one or more processors,
accessing a voice activity decision corresponding to one or more frames of a media file, the voice activity decision being generated by a VAD module;
after speech recognition of the one or more frames of the media file, receiving feedback associated with the voice activity decision that represents a relative accuracy of the voice activity decision, the media file being processed asynchronously such that each of the one or more frames is accessed prior to the generating the feedback, the feedback being generated by a speech recognizer; and
enabling use of the feedback to guide voice activity detection (VAD) for one or more subsequent frames of the media file.

9. A method as recited in claim 8, wherein the voice activity decision indicates whether the one or more frames includes speech or non-speech.

10. A method as recited in claim 8, further comprising converting the one or more frames into a text transcript representative of a content of the media file.

11. A method as recited in claim 8, further comprising confidence-scoring a transcript corresponding to the media file such that words or phrases within the transcript that exceed a predetermined threshold are deemed to be confident.

12. A method as recited in claim 8, wherein the feedback is leveraged to update models associated with a VAD module that are used for VAD.

13. A system comprising:
one or more processors;
memory communicatively coupled to the one or more processors for storing:
a voice activity detection (VAD) module configured to:
assign a probability to a first frame of a media file that represents a likelihood that the first frame includes speech; and
update the probability of the first frame based at least in part on one or more frames within a frame window;
assign a probability to a second frame within the frame window, the probability assigned to the second frame representing a likelihood that the second frame includes speech, the second frame being subsequent to the first frame; and
update the probability of the first frame based at least in part on the probability of the second frame.

14. A system as recited in claim 13, wherein the VAD module is further configured to:
classify the first frame as including speech or non-speech;
classify a second frame within the frame window as including speech or non-speech; and
update the classifying of the first frame based at least in part on the classifying associated with the second frame.

15. A system as recited in claim 13, wherein the VAD module is further configured to update the probability of the first frame prior to the first frame being processed by a speech recognizer.

16. A system as recited in claim 13, wherein the VAD module is further configured to delay a voice activity detection decision associated with the first frame until the probability of the first frame is updated.

17. A system as recited in claim 13, wherein the memory further stores a speech recognizer configured to convert one or more speech frames of the media file identified by the VAD module into a text transcript.

18. A system as recited in claim 13, wherein the feedback includes a text transcript representing a content of one or more frames of the speech.

19. A system as recited in claim 18, wherein the text transcript is confidence-scored.

20. A system as recited in claim 19, wherein the confidence-scored text transcript includes words or phrases of the media file that exceed a predetermined threshold of reliability.

* * * * *